(12) United States Patent
Barker

(10) Patent No.: US 8,891,331 B2
(45) Date of Patent: Nov. 18, 2014

(54) STEERABLE SOURCE ARRAY AND METHOD

(75) Inventor: Glen Barker, Massy Cedex (FR)

(73) Assignee: CGGveritas Services SA, Massy Cedex (FR)

( * ) Notice: Subject to any disclaimer, the term of this patent is extended or adjusted under 35 U.S.C. 154(b) by 504 days.

(21) Appl. No.: 13/238,126

(22) Filed: Sep. 21, 2011

(65) Prior Publication Data

US 2013/0070559 A1 Mar. 21, 2013

(51) Int. Cl.
*G01V 1/38* (2006.01)
*B63B 21/66* (2006.01)

(52) U.S. Cl.
CPC .............. *G01V 1/3826* (2013.01); *B63B 21/66* (2013.01); *G01V 1/3861* (2013.01)
USPC .............................. 367/16; 114/244; 114/253

(58) Field of Classification Search
CPC ... G01V 1/006; G01V 1/3861; G01V 1/3808; G01V 1/38; B63B 21/66
USPC ..................................... 367/16–18
See application file for complete search history.

(56) References Cited

U.S. PATENT DOCUMENTS

| | | | |
|---|---|---|---|
| 3,921,124 A | 11/1975 | Payton | |
| 4,087,780 A | 5/1978 | Itria et al. | |
| 4,323,989 A | 4/1982 | Huckabee et al. | |
| 4,506,352 A | 3/1985 | Brandsaeter | |
| 4,719,987 A | 1/1988 | George, Jr. et al. | |
| 4,748,599 A | 5/1988 | Gjestrum et al. | |
| 4,831,599 A | 5/1989 | Dragsund et al. | |
| 4,845,686 A | 7/1989 | Brac | |
| 4,862,422 A | 8/1989 | Brac | |
| 6,011,753 A | 1/2000 | Chien | |
| 6,606,958 B1 | 8/2003 | Bouyoucos | |
| 6,681,710 B2 | 1/2004 | Semb | |
| 7,415,936 B2 | 8/2008 | Storteig et al. | |
| 7,450,467 B2 * | 11/2008 | Tveide et al. | 367/16 |
| 7,457,193 B2 | 11/2008 | Pamik | |
| 7,463,549 B2 | 12/2008 | Naess | |
| 7,466,632 B1 | 12/2008 | Sorli | |

(Continued)

FOREIGN PATENT DOCUMENTS

| | | |
|---|---|---|
| EP | 0 018 053 A1 | 10/1980 |
| GB | 2414804 A | 12/2005 |

(Continued)

OTHER PUBLICATIONS

Australian Patent Examination Report No. 1, issued Jun. 14, 2013 in related Australian Patent Application No. 2012216742.

*Primary Examiner* — Ian J Lobo
(74) *Attorney, Agent, or Firm* — Patent Portfolio Builders PLLC

(57) ABSTRACT

Method and marine acoustic source array for generating an acoustic wave in a body of water. The marine acoustic source array includes first and second external source sub-arrays, each sub-array including one or more individual source elements; a first actuator device connected to the first external source sub-array; and a second actuator device connected to the second external source sub-array. The first actuator device has a corresponding cable configured to connect to a first lead-in, and the second actuator device has a corresponding cable configured to connect to a second lead-in such that a position of the source array as a whole is controllable along a line substantially perpendicular to a path of the source array.

20 Claims, 10 Drawing Sheets

(56) References Cited

U.S. PATENT DOCUMENTS

| | | |
|---|---|---|
| 7,577,060 B2 | 8/2009 | Toennessen et al. |
| 7,738,317 B2 | 6/2010 | Toennessen |
| 7,804,738 B2 | 9/2010 | Storteig et al. |
| 2002/0064088 A1* | 5/2002 | Barker .................... 367/20 |
| 2007/0019504 A1* | 1/2007 | Howlid et al. .................... 367/16 |
| 2007/0064526 A1 | 3/2007 | Holo |
| 2007/0247971 A1 | 10/2007 | Semb et al. |
| 2008/0279042 A1 | 11/2008 | Storteig et al. |
| 2008/0316859 A1 | 12/2008 | Welker et al. |
| 2009/0092005 A1 | 4/2009 | Goujon et al. |
| 2009/0141587 A1 | 6/2009 | Welker et al. |
| 2010/0135112 A1* | 6/2010 | Robertsson .................... 367/16 |
| 2010/0149910 A1* | 6/2010 | Martin .................... 367/17 |
| 2010/0170428 A1* | 7/2010 | Toennessen .................... 114/249 |
| 2011/0149681 A1* | 6/2011 | Hovland et al. .................... 367/15 |

FOREIGN PATENT DOCUMENTS

| | | |
|---|---|---|
| GB | 2 400 662 B | 8/2006 |
| WO | 01/61380 A2 | 8/2001 |
| WO | 2011161118 A1 | 12/2011 |

* cited by examiner

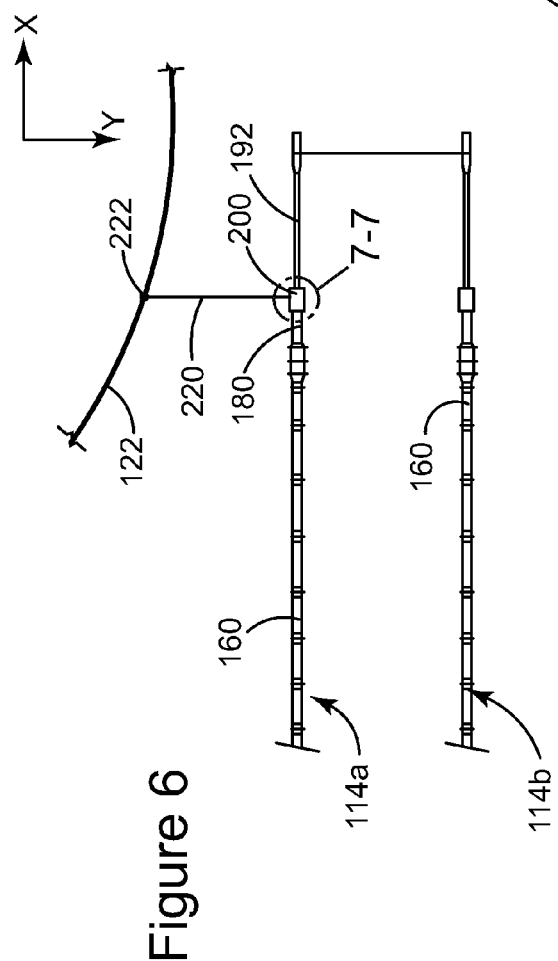
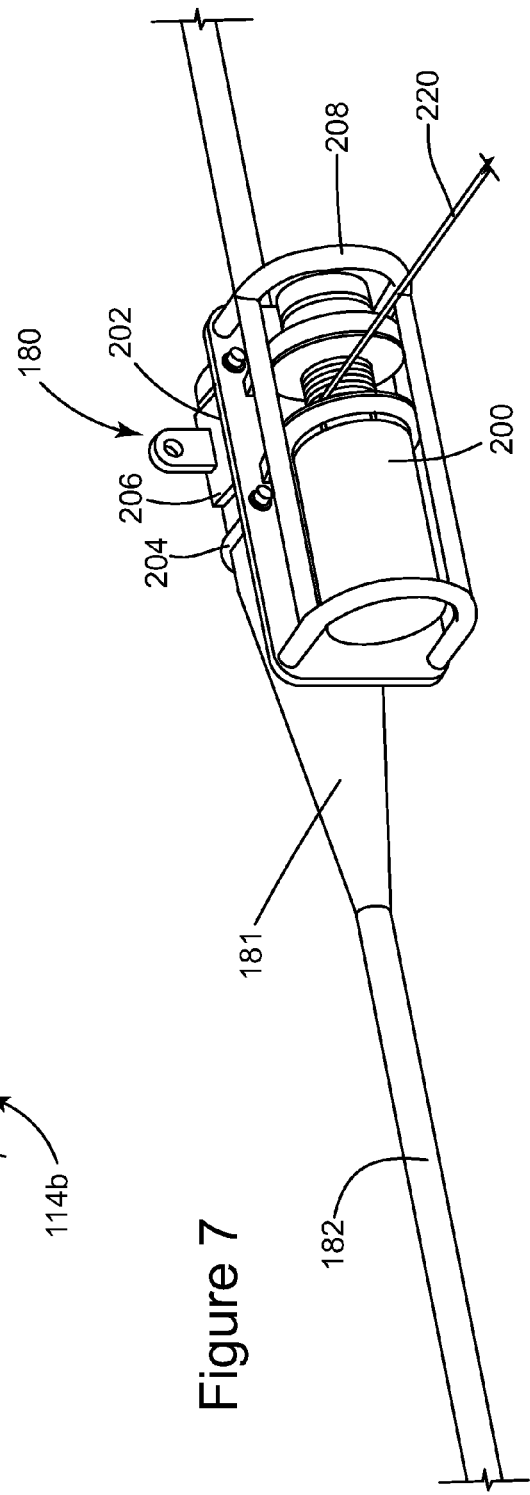
Figure 6
Figure 7

STEERABLE SOURCE ARRAY AND METHOD

BACKGROUND

1. Technical Field

Embodiments of the subject matter disclosed herein generally relate to methods and systems and, more particularly, to mechanisms and techniques for steering a source array while being towed underwater.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high resolution image of the geophysical structures under the seafloor is an ongoing process.

Reflection seismology is a method of geophysical exploration to determine the properties of earth's subsurface, which are especially helpful in the oil and gas industry. Marine reflection seismology is based on using a controlled source of energy that sends the energy into the earth. By measuring the time it takes to the reflections to come back to plural receivers, it is possible to evaluate the depth of features causing such reflections. These features may be associated with subterranean hydrocarbon deposits.

A traditional system for generating the seismic waves and recording their reflections off the geological structures present in the subsurface is illustrated in FIG. 1. A vessel 10 drags an array of seismic receivers 11 provided on streamers 12. The streamers may be disposed horizontally, i.e., lying at a constant depth relative to a surface 14 of the ocean. The streamers may be disposed to have other spatial arrangements than horizontally. The vessel 10 also drags a seismic source array 16 that is configured to generate a seismic wave 18. The seismic wave 18 propagates downwards toward the seafloor 20 and penetrates the seafloor until eventually a reflecting structure 22 (reflector) reflects the seismic wave. The reflected seismic wave 24 propagates upwardly until is detected by the receiver 11 on streamer 12. Based on the data collected by the receiver 11, an image of the subsurface is generated by further analyses of the collected data.

The seismic source array 16 includes plural individual source elements. The individual source elements may be distributed in various patterns, e.g., circular, linear, at various depths in the water. FIG. 2 shows a vessel 40 towing two ropes 42 provided at respective ends with deflectors 44. Plural lead-in cables 46 are connected to streamers 50. The plural lead-in cables 46 also connect to the vessel 40. The streamers 50 are maintained at desired separations from each other by separation ropes 48. Plural individual source elements 52 are also connected to the vessel 40 and to the lead-in cables 46 via ropes 54. However, this configuration does not allow an accurate control of the plural individual source elements. In other words, a position of the source array 16 cannot be adjusted except by changing the positions of the deflectors 44.

Further, the presence of the deflectors 44 introduces a further control problem as the deflectors rely on hydrodynamic forces, e.g., lift, created by the motion through the water to pull the streamers 50 outwardly to maintain their separation relative to the vessel path during the survey. Thus, water currents or other environmental factors may affect the lift, determining the deflectors to move closer to each other. As such, the positions of the streamers 50 and the plural individual source elements 52 are affected by the positions of the deflectors.

As the four-dimensional (4-D) geophysical imaging is becoming more desired today, controlling the position of the source array is important. 4-D geophysical imagining involves 3-D seismic surveys repeated over a same subsurface at different moments in time to determine changes in the geophysical structures of the subsurface. Thus, as the 3-D survey is repeated in time, sometimes after a couple of months or years, it is desirable that the sources being used to generate the seismic waves are located as closely as possible to the same locations as in the previous survey over the subsurface.

Thus, it is challenging with the existing source technology to position a same source array, at different moments in time, at the same locations given the cross-currents, wind, waves, shallow water and navigation obstacles that are currently encountered by the vessels that perform the seismic surveys.

Accordingly, it would be desirable to provide systems and methods that provide a steerable source array having the capability to be positioned at a desired location during towing underwater by a vessel.

SUMMARY

According to one exemplary embodiment, there is a marine acoustic source array for generating an acoustic wave in a body of water. The marine acoustic source array includes first and second external source sub-arrays, each sub-array including one or more individual source elements; a first actuator device connected to the first external source sub-array; and a second actuator device connected to the second external source sub-array. The first actuator device has a corresponding cable configured to connect to a first lead-in, and the second actuator device has a corresponding cable configured to connect to a second lead-in such that a position of the source array as a whole is controllable along a line substantially perpendicular to a path of the source array.

According to another exemplary embodiment, there is a marine acoustic source array for generating an acoustic wave in a body of water. The marine acoustic source array includes first and second lead-ins configured to be towed by a vessel and to connect to streamers and not deflectors; first and second external source sub-arrays provided between the first and second lead-ins, each sub-array including one or more individual source elements; a first actuator device connected to the first external source sub-array; and a second actuator device connected to the second external source sub-array. The first actuator device has a corresponding cable configured to connect to the first lead-in and the second actuator device has a corresponding cable configured to connect to the second lead-in such that a position of the source array as a whole is controllable along a line substantially perpendicular to a path of the source array.

According to still another exemplary embodiment, there is a method for controlling a position of a marine acoustic source array that generates an acoustic wave in a body of water. The method includes a step of activating a first actuator device connected to a first external source sub-array to increase or decrease a length of a cable connected to a first lead-in, wherein the first lead-in is connected to a streamer and not a deflector; and a step of activating a second actuator device connected to a second external source sub-array to decrease or increase a length of a cable connected to a second lead-in such that a position of the source array as a whole is controllable along a line substantially perpendicular to a path of the source array.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 is a top view of two sub-arrays having an actuation device according to an exemplary embodiment;

FIG. 7 is close view of the actuation device as attached to a sub-array according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a source array being towed by a vessel. However, the embodiments to be discussed next are not limited to this source array, but may be applied to other seismic elements.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need a steerable source array. According to an exemplary embodiment, such a steerable source array is configured to include at least an actuation device, mounted on the source array, which is capable to actuate a link to change a position of the source array in a plane substantially parallel with a surface of the water. The actuation device may be provided to modify the position of the entire source array or only a part of the source array, e.g., a sub-array or an individual source element. The actuation device may be a winch that is electrically driven. The actuation device may be configured to be driven by a control mechanism that is located on a towing vessel, a control mechanism that is provided on the source array, a combination of them or to be manually driven.

Figure 1:
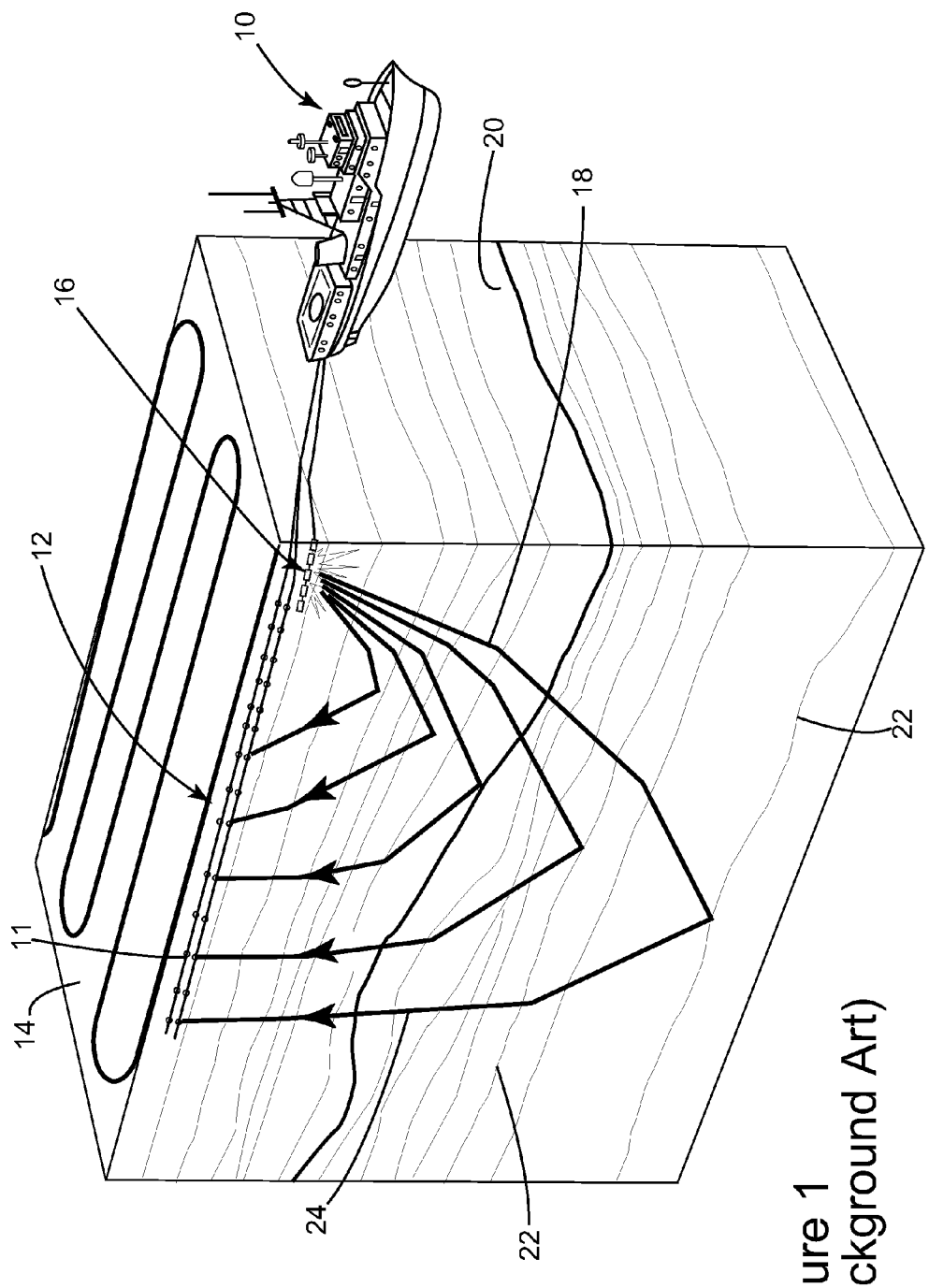
FIG. 1 is a schematic diagram of a conventional seismic survey system.
Figure 2:
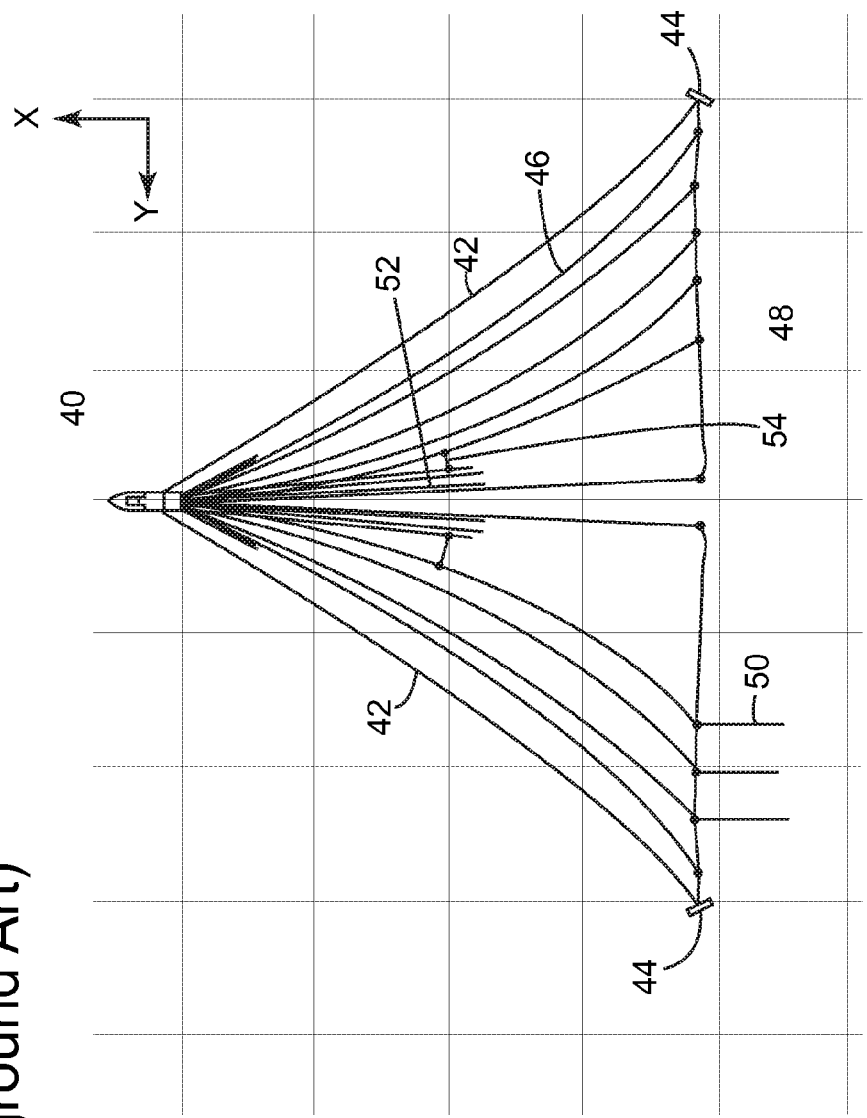
FIG. 2 illustrates a traditional arrangement of a source array that is towed by a vessel.
Figure 3:
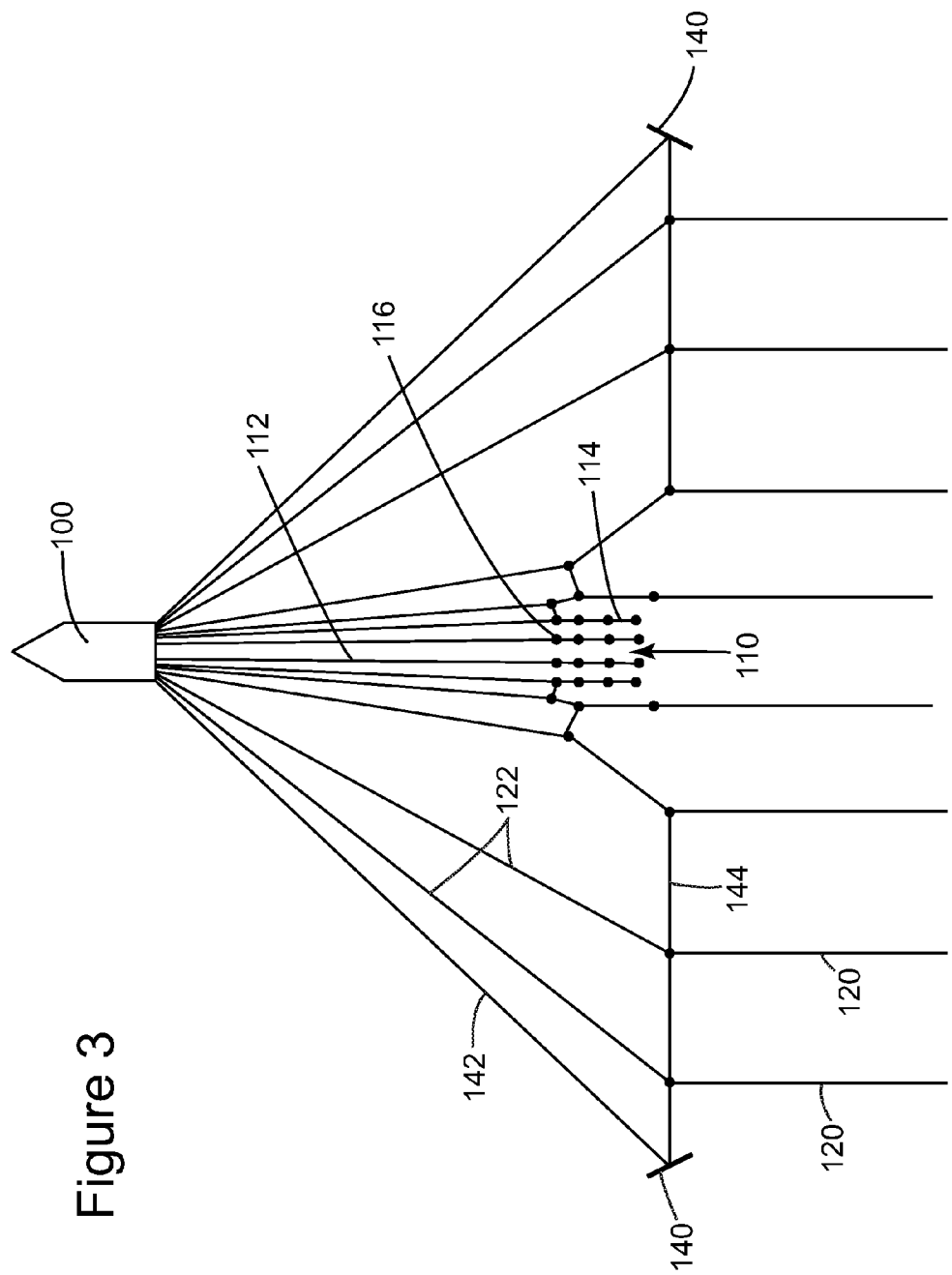
FIG. 3 illustrates an arrangement of a steerable source array and plural streamers according to an exemplary embodiment.

According to an exemplary embodiment illustrated in FIG. 3, a vessel 100 tows a source array 110 and plural streamers 120. The streamers 120 are connected to the vessel through lead-ins 122 while the source array 110 is connected through cables 112 to the vessel 100. The source array 110 includes sub-arrays 114, each having plural individual source elements 116. Deflectors 140 are provided on the sides of this arrangement to maintain a transverse distance (relative to a path of the vessel) between the streamers 120. The deflectors 140 are connected to the vessel 100 via wide tow ropes or cables 142 and spread ropes or cables 144 are used to separate the streamers from each other. The number of streamers or individual source elements is exemplary and not intended to limit the applicability of the novel concepts.

Figure 4:
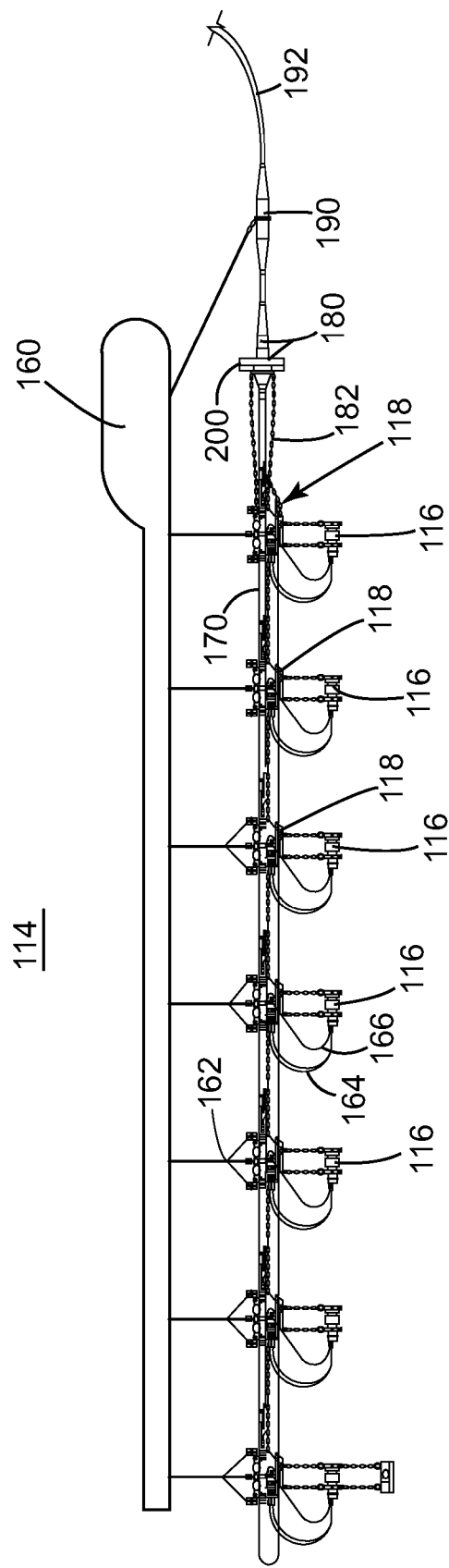
FIG. 4 is a schematic diagram of a steerable source array according to an exemplary embodiment.

A single sub-array 114 is shown in FIG. 4. The sub-array 114 includes one or more floats 160 from which the individual source elements 116 are suspended with cables or ropes 162. In one application, clusters of individual source elements are provided at the location 116. Various cables connect the individual source elements 116 to the vessel for providing electric power, compressed air, data transmission etc. For example, a cable 164 provides the compressed air and a cable 166 provides electric power and/or data transmission.

The source bases 118 are connected to each other via links 170 and also to a bell housing 180 via a connection 182. In one application, the links 170, bell housing 180 and the connection 182 may form an enclosure in which the various cables 164 and 166 are provided. The bell housing 180 may be made of a resistant material, for example, stainless steel. A bend restrictor device 190 may be connected to the bell housing 180 and also to the vessel 100 via an umbilical 192. The bend restrictor device 190 is configured to prevent an over bending of the source array due to the towing force applied via the umbilical 192 on the source array. The bend restrictor 190 may also be made of a resistant material. In one application, the bell housing 180 is directly connected to the umbilical 192.

Figure 5:
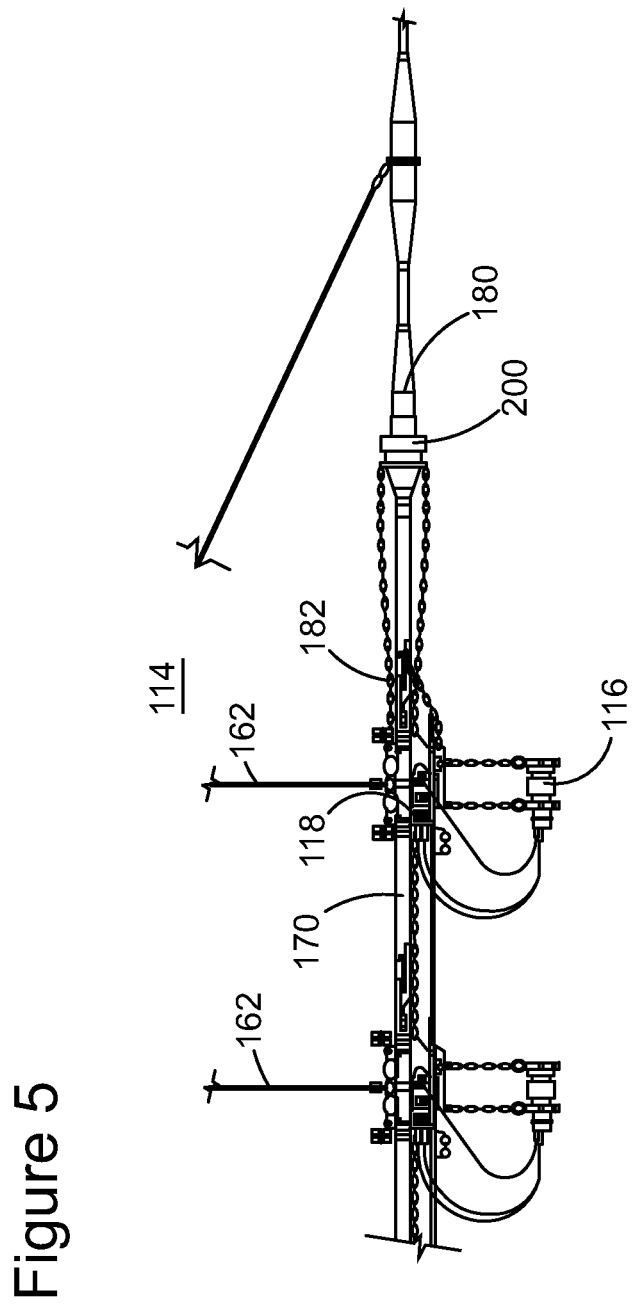
FIG. 5 is a schematic diagram of a front portion of a steerable source sub-array according to an exemplary embodiment.

An actuator device 200 is attached on a side of the bell housing 180 as shown in FIG. 5. Electrical and/or data cables are provided from the bell housing 180 to the actuator device 200 for instructing the actuator device to retrieve or release a corresponding cable and for providing electrical energy. The electrical energy may be provided from the vessel or from a battery installed at the source array, for example, in the bell housing.

A top view of two sub-arrays 114a and 114 is shown in FIG. 6. It is noted that only two sub-arrays are shown for simplicity. In practical applications, more than two sub-arrays may be present. A lead-in 122 is also shown next to sub-array 114a. The actuator device 200 is connected to a side of the bell housing 180 of the array 114a. In FIG. 6, a cable 220 is shown extending from the actuator device 200 to the lead-in 122. A more detailed view of the actuator device 200, cable 220 and the bell-housing 180 are shown in FIG. 7. The actuator device 200 may be a winch that is attached, for example, to a base plate 202. The base plate 202 is connected by bolts 204 and screws 206 to the bell housing 180. Other methods for connecting the winch to the bell housing may be used. FIG. 7 also shows the bell housing 180 connected to the connection (or umbilical) 182 via an intermediate piece 181. For example, this intermediate piece 181 may be made of polyurethane and thus has a bending property. In one application, the actuator device 200 may be attached to the bend restrictor 190 instead of the bell housing 180.

In one exemplary embodiment, the winch is configured to have its speed controllable, to be able to pull at least 3000 Kg, to operate at least up to 30 m depth, to have a capacity for 25 m of 8 mm thick rope, to use electrical power in the range of 220-440 VAC, to include protective crash bars 208, to have a brake to hold the load without power, and to include controls for ON/OFF and IN/OUT operations.

Returning to FIG. 6, it is noted that cable 220 may be either fixed to the lead-in 122 or may be provided with a pulley 222 that can move freely along the cable 220. Thus, the cable 220 may be maintained substantially perpendicular on the sub-array 114a as a length of the cable 220 is adjusted by the actuator device 200.

Figure 8:
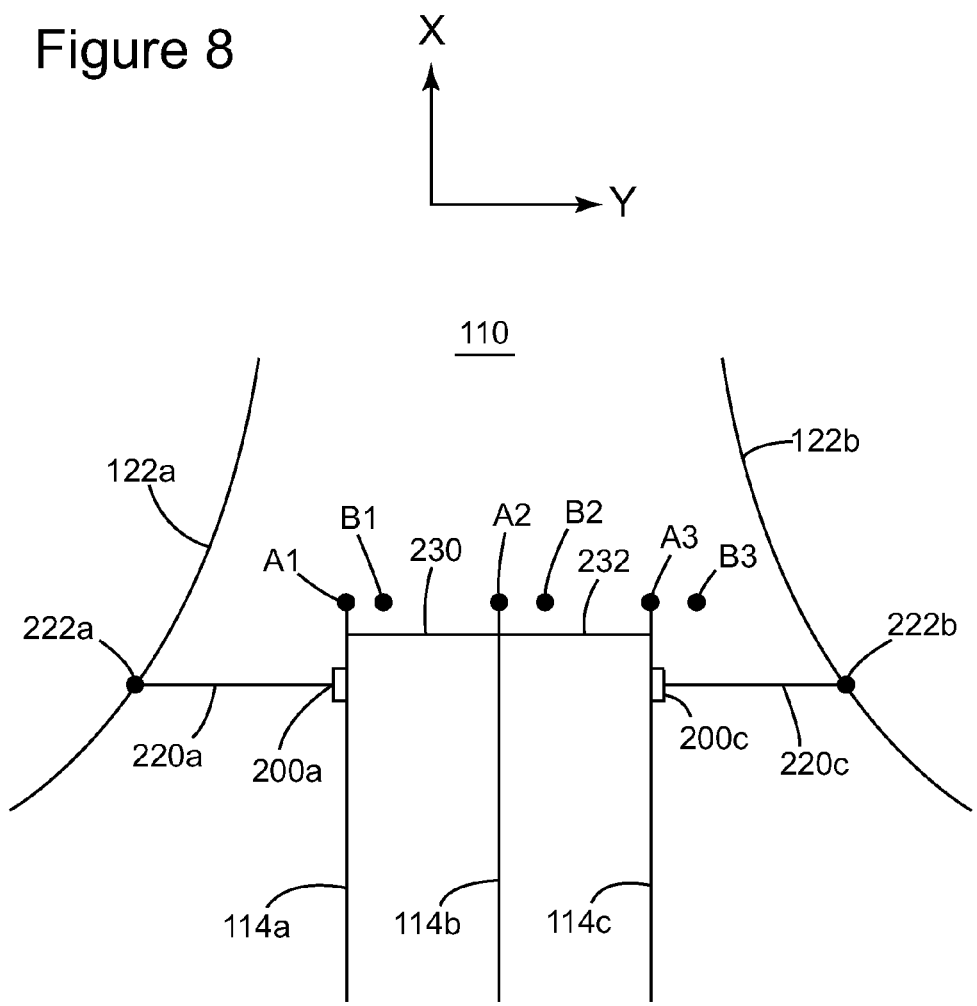
FIG. 8 is a schematic diagram of a source array with external sub-arrays having corresponding actuation devices according to an exemplary embodiment.

When in operation, supposing that the lead-in cable 122 is at a desired position, a position of the sub-array 114a along the Y axis (cross-line) may be adjusted as desired. In other words, the vessel is towing the source array along the X axis in FIG. 6 and the position of the sub-array can be adjusted along the cross-line, which is substantially perpendicular on the towing direction and substantially in the plane of the water surface. More specifically, FIG. 8 shows a source array 110 having three sub-arrays 114a-c provided between lead-ins 122a and 122b. Cables 230 and 232 ensure that a distance along y axis between the sub-arrays cannot exceed a given length. The length of the cables 230 and 232 is fixed. Actuation devices 220a and 220c are provided at the two external sub-arrays 114a and 114c. Of course, the number of sub-arrays shown in the figure is illustrative and more than three sub-arrays may be used. When desired to change the positions of the sub-arrays 114a-c from positions A1-A3 to B1-B3, the control system instructs the actuation device 200c to retrieve the corresponding cable 220c and the actuation device 200a to release the corresponding cable 220a. Similarly, if the sub-arrays 114a-c need to be moved in an opposite direction, the reverse instructions are sent to the actuation devices. Thus, according to this exemplary embodiment, the position of the entire source array (i.e., all the sub-arrays) may be changed by actuating a single actuator device. Also, according to an application, the lead-ins to which the ropes of the actuator devices are attached to are not configured to support deflectors 140 as shown in FIG. 3 but rather streamers 120.

Figure 9:
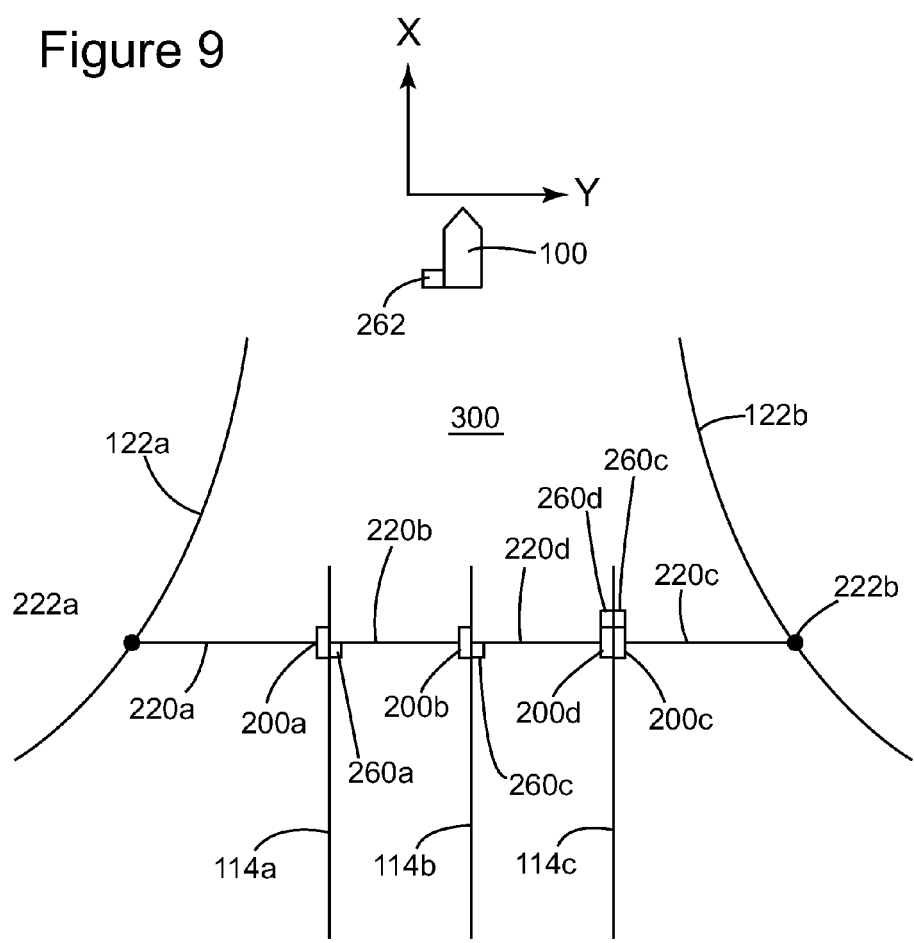
FIG. 9 is a schematic diagram of a source array with external and internal sub-arrays having corresponding actuation devices according to an exemplary embodiment.
Figure 10:
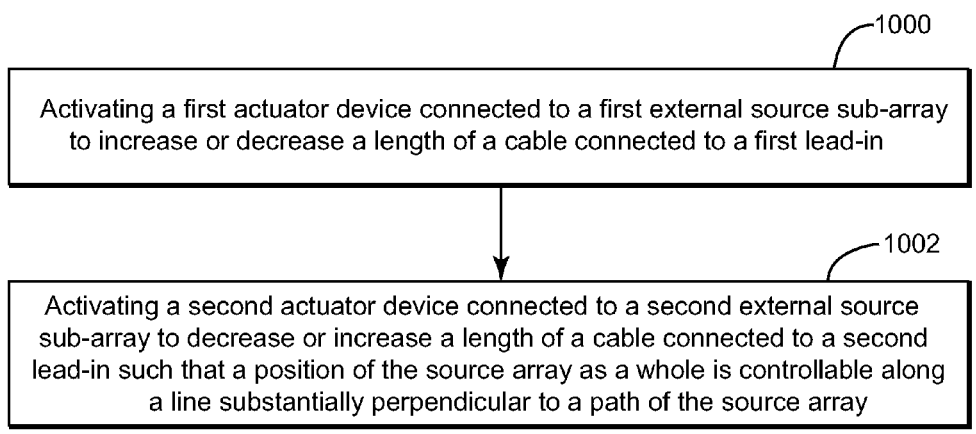
FIG. 10 is a flow chart of a method for steering a source array according to an exemplary embodiment.

According to another exemplary embodiment it is possible that some internal sub-array and not only the external sub-arrays have a corresponding actuation device. FIG. 9 shows a source array 300 having three sub-arrays 114a-c, each sub-array having its own actuation device. In this way, it is possible to position each sub-array as desired and also to modify a distance between consecutive sub-arrays. The embodiment shown in FIG. 9 shows the sub-array 114c having two actuation devices 200c and 200d, one on each side of the bell housing.

To control the actuation devices, it is possible to have an individual control mechanism for each actuation device and/or a central control mechanism. For example, as shown in FIG. 9, the actuation device 200a may have its own local control mechanism 260a that may be programmed to maintain a certain position of the corresponding sub-array 114a. In another application, the local control mechanism 260a communicates (wired or wireless) with a central control mechanism 262, situated on the towing vessel 100. In this application, the central control mechanism 262 instructs the local control mechanism 260a when and how long to activate the actuation device.

According to an exemplary embodiment, there is a method for controlling a position of a marine acoustic source array (110) that generates an acoustic wave in a body of water. The method includes a step 1000 of activating a first actuator device (200a) connected to a first external source sub-array (114a) to increase or decrease a length of a cable (220a) connected to a first lead-in (122a), wherein the first lead-in (122a) is connected to a streamer and not a deflector; and a step 1100 of activating a second actuator device (200c) connected to a second external source sub-array (114c) to decrease or increase a length of a cable (220c) connected to a second lead-in (122b) such that a position of the source array as a whole is controllable along a line substantially perpendicular to a path of the source array.

The method may optionally include a step of sending an actuation instruction from a central control mechanism (262) to a local control mechanism (260a) provided at the first actuation device (200a) to actuate the first actuation device (200a). Also, the method may include a step of rolling a first pulley (222a) connected to the cable of the first actuator device (200a) on the first lead-in (122a); and a step of rolling a second pulley (222b) connected to the cable of the second actuator device (200c) on the second lead-in (122b).

Figure 11:
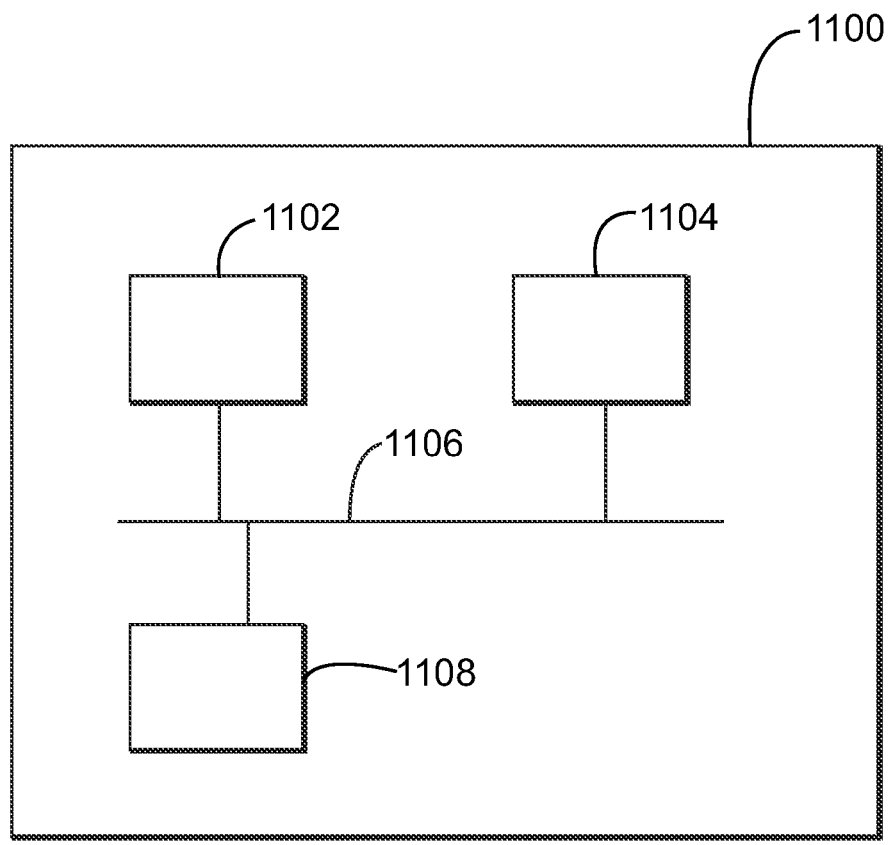
FIG. 11 is a schematic diagram of a controller for steering the source array.

The local and/or central controller is schematically illustrated in FIG. 11. Such a controller 1100 includes a processor 1102 and a storage device 1104 that communicate via a bus 1106. An input/output interface 1108 also communicates with the bus 1106 and allows an operator to communicate with the processor or the memory, for example, to input software instructions for operating the actuator devices. The input/output interface 1108 may also be used by the controller to communicate with other controllers or interfaces that are provided on the vessel. For example, the input/output interface 1108 may communicate with a GPS system (not shown) for acquiring an actual position of the source array. The controller 1100 may be computer or a server.

One or more of the exemplary embodiments discussed above provide a source array having a position that may be controlled along a line substantially perpendicular to a travel path of a vessel towing the source array. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine acoustic source array for generating an acoustic wave in a body of water, the marine acoustic source array comprising:
   first and second external source sub-arrays, each sub-array including one or more individual source elements;
   a first actuator device located on the first external source sub-array; and
   a second actuator device located on the second external source sub-array,
   wherein the first actuator device has a corresponding first cable configured to connect to a first lead-in, and the second actuator device has a corresponding second cable configured to connect to a second lead-in such that a position of the source array as a whole is controllable along a line substantially perpendicular to a path of the source array by adjusting corresponding lengths of the first and second cables, and wherein one of the first and second lead-ins connects to a streamer and not a deflector.

2. The marine acoustic source array of claim 1, wherein the other of the first and second lead-ins is configured to connect to streamers and not deflectors.

3. The marine acoustic source array of claim 1, further comprising:
an internal sub-array sandwiched between the first and second external sub-arrays and configured to have an actuation device.

4. The marine acoustic source array of claim 3, further comprising:
a third actuator device provided on the second external sub-array,
each actuator device configured to connect with a corresponding cable to an adjacent sub-array or an adjacent lead-in.

5. The marine acoustic source array of claim 4, further comprising:
a local control mechanism provided at the first actuation device; and
a central control mechanism provided on a towing vessel.

6. The marine acoustic source array of claim 1, further comprising:
a first pulley connected to the first cable of the first actuator device and configured to roll on the first lead-in; and
a second pulley connected to the second cable of the second actuator device and configured to roll on the second lead-in.

7. The marine acoustic source array of claim 1, wherein the first actuator device is located on a side of a bell housing of the first external sub-array.

8. The marine acoustic source array of claim 1, wherein the first actuator device is a winch electrically actuated with electrical energy provided from a vessel that tows the source array or from a battery located on the source array.

9. A marine acoustic source array for generating an acoustic wave in a body of water, the marine acoustic source array comprising:
first and second lead-ins configured to be towed by a vessel and to connect to streamers and not deflectors;
first and second external source sub-arrays provided between the first and second lead-ins, each sub-array including one or more individual source elements;
a first actuator device located on the first external source sub-array; and
a second actuator device located on the second external source sub-array,
wherein the first actuator device has a corresponding first cable configured to connect to the first lead-in and the second actuator device has a corresponding second cable configured to connect to the second lead-in such that a position of the source array as a whole is controllable along a line substantially perpendicular to a path of the source array by adjusting corresponding lengths of the first and second cables.

10. The marine acoustic source array of claim 9, further comprising:
an internal sub-array sandwiched between the first and second external sub-arrays and configured to have no actuation device.

11. The marine acoustic source array of claim 9, further comprising:
an internal sub-array sandwiched between the first and second external sub-arrays and configured to have an actuation device.

12. The marine acoustic source array of claim 11, further comprising:
a third actuator device provided on the second external sub-array,
wherein each actuator device is configured to connect with a correspond cable to an adjacent sub-array or an adjacent lead-in.

13. The marine acoustic source array of claim 12, further comprising:
a local control mechanism provided at the first actuation device; and
a central control mechanism provided on a towing vessel.

14. The marine acoustic source array of claim 9, further comprising:
a first pulley connected to the first cable of the first actuator device and configured to roll on the first lead-in; and
a second pulley connected to the second cable of the second actuator device and configured to roll on the second lead-in.

15. The marine acoustic source array of claim 9, wherein the first actuator device is a winch electrically actuated with electrical energy provided from a vessel that tows the source array or from a battery located on the source array.

16. A method for controlling a position of a marine acoustic source array that generates an acoustic wave in a body of water, the method comprising:
activating a first actuator device located on a first external source sub-array to increase or decrease a length of a first cable connected to a first lead-in, wherein the first lead-in is connected to a streamer and not a deflector; and
activating a second actuator device located on a second external source sub-array to decrease or increase a length of a second cable connected to a second lead-in such that a position of the source array as a whole is controllable along a line substantially perpendicular to a path of the source array by adjusting corresponding lengths of the first and second cables.

17. The method of claim 16, further comprising:
actuating an actuator device of an internal sub-array sandwiched between the first and second external sub-arrays to modify a position of the internal sub-array relative to the first and second external sub-arrays.

18. The method of claim 17, further comprising:
actuating a third actuator device provided on the second external sub-array.

19. The method of claim 18, further comprising:
sending an actuation instruction from a central control mechanism to a local control mechanism provided at the first actuation device to actuate the first actuation device.

20. The method of claim 16, further comprising:
rolling a first pulley connected to the first cable of the first actuator device on the first lead-in; and
rolling a second pulley connected to the second cable of the second actuator device on the second lead-in.

* * * * *